United States Patent [19]

Genovese

[11] Patent Number: 5,724,088
[45] Date of Patent: Mar. 3, 1998

[54] HIGH-SPEED, REFLEX-CONTROLLED LASER CIRCUIT FOR AN ELECTROPHOTOGRAPHIC PRINTER

[75] Inventor: Frank C. Genovese, Fairport, N.Y.

[73] Assignee: Xerox Corporation, Stamford, Conn.

[21] Appl. No.: 623,242

[22] Filed: Mar. 27, 1996

[51] Int. Cl.$^6$ ........................................ B41J 2/47
[52] U.S. Cl. ................................. 347/246; 347/247
[58] Field of Search ........................... 347/247, 237, 347/246, 236; 372/38, 24, 25, 26; 342/250, 235

[56] References Cited

U.S. PATENT DOCUMENTS

| | | | |
|---|---|---|---|
| 4,685,097 | 8/1987 | van der Put | 369/54 |
| 4,868,675 | 9/1989 | Joosten et al. | 358/296 |
| 5,061,949 | 10/1991 | Ogino et al. | 346/160 |
| 5,164,745 | 11/1992 | Matsuoka | 346/108 |
| 5,497,181 | 3/1996 | Paoli | 347/133 |
| 5,651,017 | 7/1997 | Genovese | 372/38 |

*Primary Examiner*—Mark J. Reinhart
*Attorney, Agent, or Firm*—R. Hutter

[57] ABSTRACT

A control system for the laser diode of a raster output scanner, such as used in a laser printer, uses reflex exposure control and a high-speed drive circuit. With the creation of each pixel on the photoreceptor, a sensor receiving some of the light flux from the diode accumulates charge on a capacitor, and when the charge on the capacitor exceeds a predetermined amount, a reflex circuit acts to shut the laser diode off. The laser diode is modulated via a high-speed trigger circuit wherein the diode is maintained just below its lasing voltage.

13 Claims, 4 Drawing Sheets

HIGH-SPEED, REFLEX-CONTROLLED LASER CIRCUIT FOR AN ELECTROPHOTOGRAPHIC PRINTER

Cross-reference is made to the following co-pending U.S. patent applications, both assigned to the assignee hereof and filed Apr. 21, 1995: Ser. No. 08/426,203, "Reflex Exposure Control for a Raster Output Scanner in an Electrophotographic Printer," and Ser. No. 08/426,501, "Drive Circuit for High-Speed Modulation of a Laser Diode."

The present invention relates to a drive circuit for high-speed modulation of a laser diode. More specifically, the invention relates to a drive circuit wherein the total exposure made by the laser diode in response to digital image data is controlled by a reflex exposure control.

Electrophotographic "laser" printers, wherein a laser scan line is projected onto a photoconductive surface to create an image to be printed, are well known. In the case of printers, facsimile machines, and the like, it is common to employ a raster output scanner (ROS) as a source of optical patterns to be imaged on photographic film or an electrostatically charged photoreceptor (a photosensitive plate, belt, or drum) for purposes of printing. The ROS provides a laser beam which switches on and off according to electronic image data associated with the desired image to be printed, exposing the charged photoreceptor point by point as the beam moves, or scans, across its surface. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digital circuitry designed to control the level of operating current that defines the light flux output of a high speed laser diode. A common technique for deflecting the modulated laser beam to form a scanline across the photoreceptor surface uses a motor driven rotating optical polygon with multiple reflecting surfaces; the laser beam from the collimated laser diode source is reflected by the facets of the polygon, creating a scanning motion of the beam, which is optically imaged to form a sharply focused scan line on the photoreceptor surface. A closely spaced regular array of scan lines on a photoreceptor collectively forms a raster for exposing the desired latent image. Once a latent image is formed on the photoreceptor, the latent image is subsequently developed with toner, and the developed image is transferred to a copy sheet, as in the well-known process of electrophotography.

In a practical ROS system, the operating intensity of the laser writing beam which discharges the selected areas on the photoreceptor is an important parameter. As is well-known in the art of laser diode devices, a typical laser diode has associated therewith a minimum lasing current or "threshold current" of a predetermined magnitude, which causes the laser diode to emit a coherent laser beam. Below this lasing excitation threshold only superradiant and incoherent light is emitted. Above the lasing threshold, the intensity of laser light flux emitted by the laser diode increases approximately linearly with excitation current.

Given the excitation response of a commercially-available laser diode, it has been found that modulation speed (that is, the response to a transition in digital input data) can be improved by biasing the diode at an operating point just below the lasing threshold. To discharge picture elements (pixels) on the photoreceptor, the operating current is increased from the bias or standby condition to a current producing the desired lasing level at the appropriate time. By biasing the laser diode at an operating point just below the lasing threshold, the voltage swing associated with transitions between the standby and lasing conditions is minimized. Part of the speed improvement is the result of reducing the charge that must be supplied to parasitic circuit capacitances during transitions between the on and off states. Typically, the "lasing current" is supplied by a PNP switching transistor operated in a grounded base or grounded emitter configuration and toggled between conducting and non-conducting states according to an input digital data stream. In prior-art systems, the switching transistor output is simply summed with the constant bias current at the input node of the laser diode. One practical problem with this arrangement is that the inherent delay and storage mechanisms associated with switching a transistor between its non-conducting and conducting states constrain the maximum modulation speed of the entire system; it is well known that a transition between two low impedance conducting states is much faster.

U.S. Pat. No. 5,164,745 discloses a laser printer wherein a laser beam is detected by a photosensor, presetting a flip-flop. A timer is driven in accordance with a preset output from the flip-flop, driving the laser to emit a laser beam. A second timer is driven in response to a front edge of the preset output of the flip-flop to generate a horizontal synchronizing signal.

U.S. Pat. No. 5,061,949 discloses, in FIG. 4 thereof, a triggering and feedback system for a laser diode in a laser printer. As can be seen, a bias voltage is applied to the laser diode at a point downstream of a switch SW3 which is used to selectably activate the laser diode. Further downstream of the switch SW3 is a feedback system by which light detected from the laser diode is adjusted in intensity.

U.S. Pat. No. 4,868,675 discloses a control circuit for a laser printer which utilizes a laser switching amplifier for supplying current to a laser diode. The control circuit has a correction circuit which compensates for the turn-on delay time of the laser diode. The correction circuit lengthens the incoming image signal, controlling the laser diode by pulse width modulation.

U.S. Pat. No. 4,685,097 discloses an exposure control system for a laser printer, in which a light sensing diode is used to determine laser output power and control exposure by adjusting read and write currents supplied to the laser.

According to the present invention, there is provided a raster output scanning apparatus for directing a modulated writing beam to a photosensitive surface to selectably expose a plurality of pixel areas thereon. A laser diode is adapted to output the writing beam. A sensor diode is positioned to receive a portion of light flux directly from the laser diode while the laser diode emits the writing beam to expose one pixel area on the photosensitive surface. An accumulator is associated with the sensor diode, adapted to accumulate charge created by the sensor diode resulting from light flux from the laser diode. A comparator is associated with the accumulator, adapted to monitor charge accumulated on the accumulator and output a quench signal when the charge accumulated on the accumulator exceeds a predetermined threshold level. A drive circuit is provided for applying voltage to the laser diode to cause the laser diode to output a modulated laser beam. The drive circuit includes a drive switch, having an output connected to the laser diode, an input, and a base, the base causing a connection between the input and output when activated, a ground switch, having an output connected to ground, an input, and a base, the base causing a connection between the input and output when activated, a bias source, commonly connected to the input of the drive switch and the input of the ground switch, the bias source being of a voltage less than a lasing voltage of the laser diode, a switching source, commonly connected to the input of the drive switch and the input of the ground switch, the switching source being of a voltage greater than a lasing voltage of the laser diode when combined with the voltage of the bias source, and a video selector, adapted to selectably activate one of the base of the drive switch and the base of the ground switch. The comparator is operatively associated with at least one of the ground switch and the drive switch, whereby the quench signal from the capacitor operates to turn off the laser diode.

Figure 4:
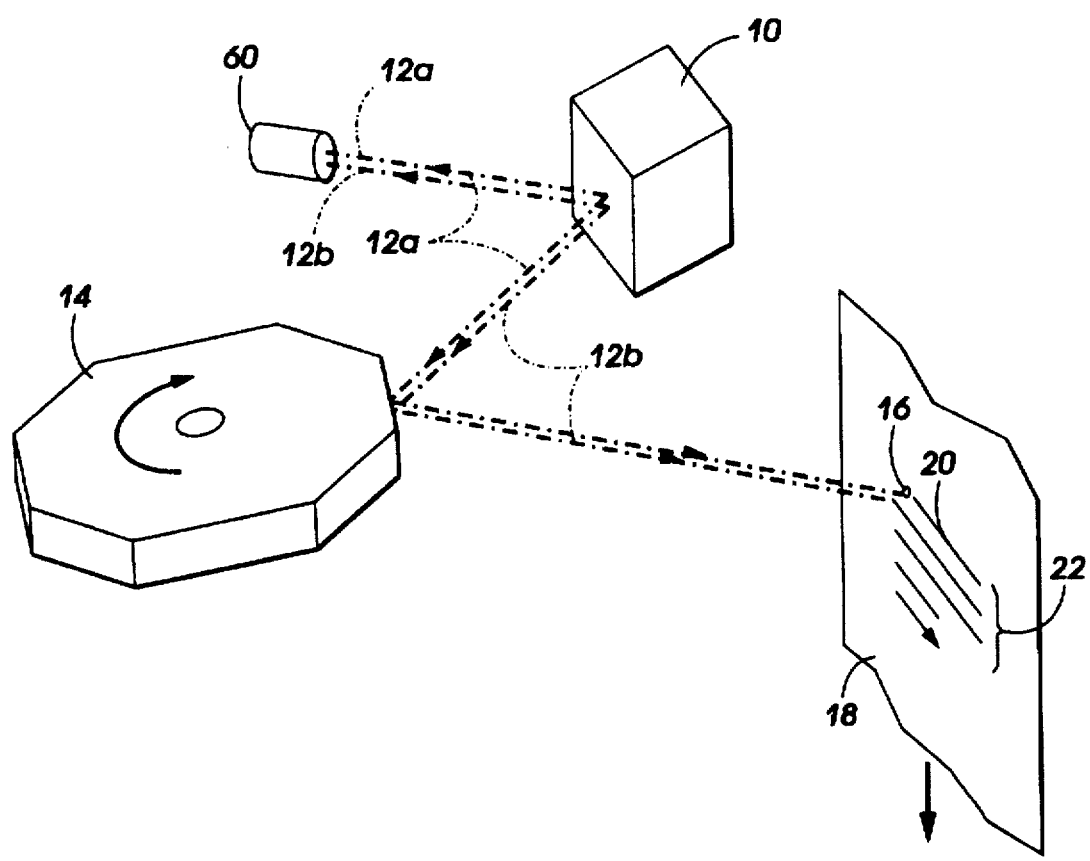
FIG. 4 is a perspective view showing the basic elements of a raster-output scanner (ROS).

FIG. 4 shows the basic configuration of a scanning system used, for example, in an electrophotographic printer or facsimile machine. A laser source 10 produces a collimated laser beam, also referred to as a "writing beam," 12 which is reflected by the facets of a rotating polygon 14. Each facet of the polygon 14 in turn deflects the writing beam 12 to create an illuminated spot 16 on the pre-charged surface of photoreceptor 18, which in this case is a moving belt. Laser source 10 also includes means for modulating the beam 12 according to image data entered therein. The localized light flux in spot 16 incident at a particular location on the surface of photoreceptor 18, corresponding to a picture element (pixel)in a "pixel area" of the desired image, discharges the surface for pixels of the desired image which are to be printed white in a charged-area development system (or, alternately, areas which are to be printed black in a discharged-area development system). In locations having pixels which are to be printed black, writing beam 12 is momentarily interrupted through the action of the modulator within source 10, so that the pixel at that location on the surface of photoreceptor 18 will not be discharged. In some implementations, gray levels can be imaged by utilizing exposure levels intermediate between the "on" and "off" levels. Thus, digital data input into laser source 10 is rendered line by line as an electrostatic latent image on the surface of photoreceptor 18.

The rotational motion of polygon 14 results in a spot 16 moving across the surface of photoreceptor 18 to form a scan line 20 of selectively discharged areas on photoreceptor 18. At the same time, the surface of photoreceptor 18 is slowly translated at a constant velocity so that the periodic scanning of spot 16 across the moving photoreceptor 18 creates an evenly spaced closely spaced array of scan lines 20, called a raster 22, on the surface of photoreceptor 18, forming the desired continuous image to be printed. One skilled in the art will appreciate that such a configuration has traditionally further included any number of conditioning and imaging lenses, mirrors and translational mechanisms (not shown) to accommodate a specific design.

Figure 1:
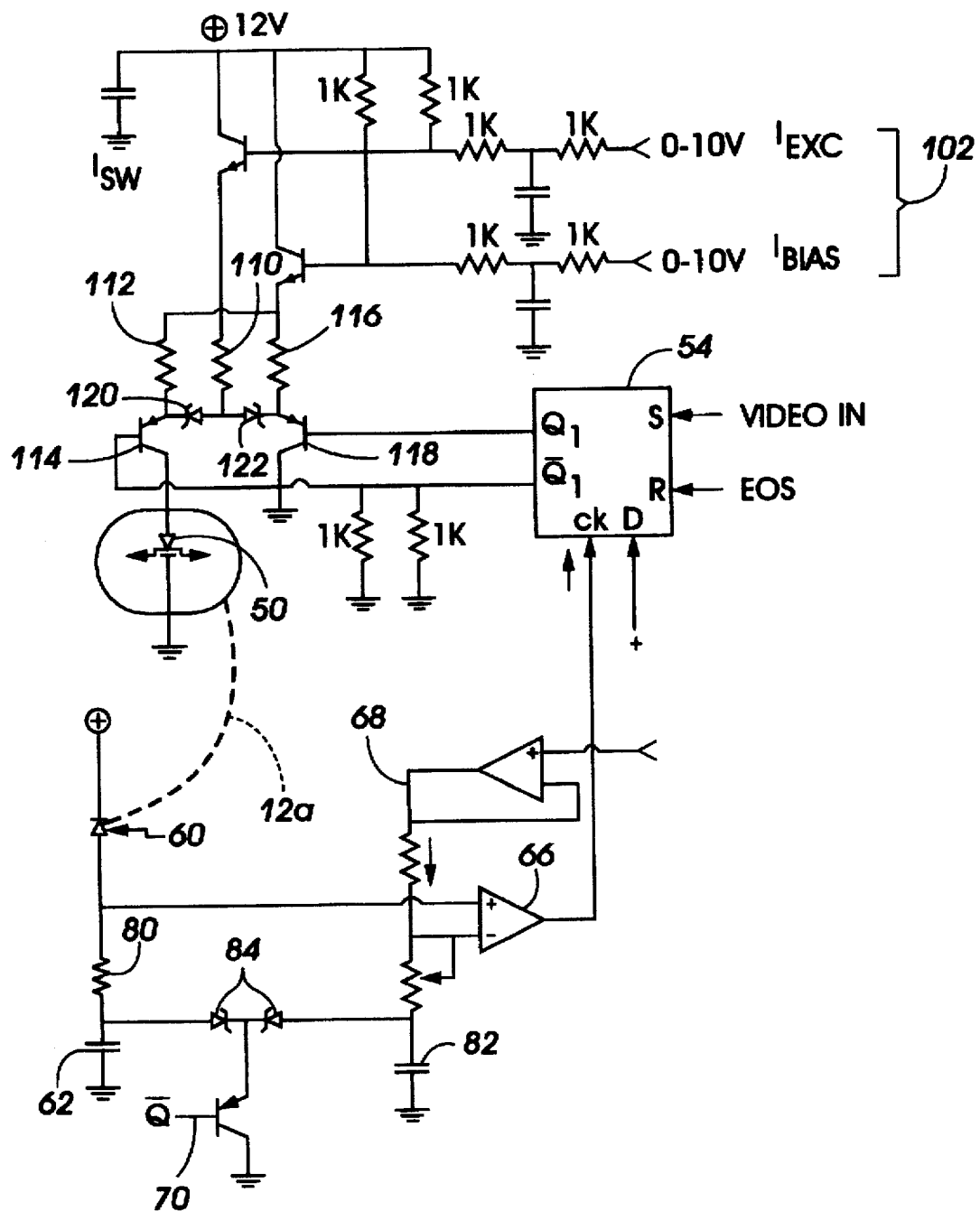
FIG. 1 is a schematic diagram of one embodiment of a drive circuit according to the present invention.

FIG. 1 shows, in the upper portion thereof, the drive circuit according to the present invention. The drive circuit, generally indicated as 100 is adapted to drive a laser diode indicated as 50, all of which forms at least part of laser source 10. The portion of the drive circuit in the top portion of the schematic, generally indicated as 102, represents a basic supply circuit for developing the desirable bias and lasing currents from an external power supply. Although the configuration shown is preferred for one known embodiment of the drive circuit, it will be apparent that other configurations of current sources in circuit 102 are possible.

The two operational variables of circuit 102 are the laser excitation current $I_{EXC}$, which is typically on the order of 20 to 35 ma, and the bias current $I_{BIAS}$, which is typically about 50 ma. $I_{EXC}$ is developed by the potential drop across resistor 110, while $I_{BIAS}$ for transistors 114 and 118 is developed by the potential drop across resistors 112 and 116 of nominally equal value. As shown in the Figure, both $I_{EXC}$ and $I_{BIAS}$ flow to common points at the emitters of transistor 114 and 118. In the preferred embodiment of the invention, transistors 114 and 118 are PNP transistors operating in the grounded base configuration, and currents $I_{EXC}$ and $I_{BIAS}$ are summed at the emitters thereof, as shown.

Further, current $I_{EXC}$ flows to the emitters of transistors 114 and 118 through Schottky diodes 120 and 122, respectively. As is known in the art, a Schottky diode consists of a junction in which majority carriers carry the current flow. When the diode is forward-biased, the carriers are injected into the metal side of the junction and remain "hot" with respect to the metal lattice. Consequently, such diodes can be switched at extremely high rates with a relatively small difference in forward bias potential.

As can further be seen in FIG. 1, the bases of transistors 114 and 118 are connected to the inverting and non-inverting outputs of a high speed flip-flop 54 (which will be described in detail below), which establishes the base potential of each transistor at one of the two complementary gate output operating voltages. When flip-flop 54 is in one of its two possible stable states, the base of transistor 114 is at a slightly higher potential than the base of transistor 118, and when flip-flop 54 is in its other stable state, the base of transistor 118 is at a slightly higher potential than the base of transistor 114. Thus, in toggling between its two normal operating states, flip-flop 54 raises the potential of one transistor base with respect to the other. Since both transistors are operating in the grounded base configuration and are not in the cutoff condition, the emitter of one of the transistors is correspondingly raised in potential with respect to the emitter of the other transistor.

Current $I_{EXC}$ from resistor 110 reaching the node between Schottky diodes 120 and 122 flows preferentially to the emitter of the transistor at the lowest potential. The output voltage swing of an emitter coupled gate such as flip-flop 54 is typically larger than the differential forward voltage drop of Schottky diodes operated between cutoff and $I_{EXC}$ levels on the order of 20 to 35 ma. As a consequence, the entire current $I_{EXC}$ flows through the Schottky diode connected to the emitter at the lower potential, is summed with the bias current $I_{BIAS}$ flowing to that emitter, and is delivered to the transistor's collector. The collector of transistor 114, as shown, delivers current to the laser diode 50, while the collector current of transistor 118 flows directly to ground. Thus roughly equal bias currents flow at all times through both transistor 114 and transistor 118, with the additional excitation current needed for laser action being shunted to one or the other collector depending on the state of flip-flop 54. When $I_{EXC}$ is shunted to the emitter of transistor 114, it flows to laser diode 50 which is excited to lase at a specific power level to discharge one picture element on the photoreceptor surface. Conversely, when $I_{EXC}$ is shunted to the emitter of transistor 118 it flows directly to ground and only bias current $I_{BIAS}$ is delivered to the laser diode which is then below its lasing threshold. The high speed flip flop as recited in the claims, which functions to selectably shunt the lasing current to transistor 114 or transistor 118 may also be embodied by other electronic devices having a suitable output.

Viewing transistors 114 or 118 as current gates, it is evident that essentially constant currents $I_{BIAS}$ are supplied to the inputs of each gate, and an additional current $I_{EXC}$ is selectably shunted to one of the two inputs through a fast-response Schottky diode. The practical significance of this arrangement is that transistors 114 or 118 are never biased off at any time. Each transistor toggles between two highly conductive states instead of between a conduction and a cutoff condition. Thus the emitter, base, and collector of transistors 114 and 118 are always being operated at low impedance. Also, by supplying both the bias and lasing current to laser diode 50 through one transistor collector instead of summing the collectors of separate bias and lasing current sources at the laser diode input, the parasitic capacitive load at the laser diode input is reduced, improving the overall system speed. The transient response of transistors 114 and 118 for transitions between the two logical gate output states is that of emitter followers, which are generally much faster than transistor switches making transitions between a conducting state and a condition where collector current is shut completely off.

The static currents supplied in the preferred embodiment are uncompensated for changes in temperature which affect transistor base characteristics. Because the light output of laser diodes is itself a strong function of temperature, typical laser drive circuits are operated in a feedback loop whereby a light intensity sensing system operating in conjunction with the laser diode drive circuitry is used to monitor and continually adjust the mean laser beam power. However, in the present invention, as the drive circuit 100 is modulated in response to digital data, the current switching function is actually performed by hot carrier Schottky diodes, which are much faster than most transistor switches and have relatively small forward voltage drop characteristics. For the circuit shown in FIG. 1, using 10K ECL Logic, 2N3906 transistors, and the illustrated values of $I_{BIAS}$ and $I_{EXC}$, switching times have been shown to be significantly less than 2 nanoseconds under typical operating conditions.

The addition of currents at the input node of transistor 114 operating in the grounded-base configuration is essentially linear, providing the transistor is constrained to operate within an envelope of relatively high collector current gain. However, because the emitter-to-base forward voltage drop of transistor 114 changes slightly as a function of the net emitter current, the individual currents delivered by resistors 110 and 112 to the emitter node are not totally independent of each other. Since this interaction is on the order of only 1 or 2 percent, it is easily compensated by adjusting the current control inputs of circuit 102. A laser control system using the present invention in combination with a feedback loop to monitor and continually adjust the two mean laser beam power levels would automatically compensate for the current interaction as well.

In the above embodiments, the advantage of incorporating Schottky diode 122 for the current path to ground is that by providing circuit symmetry, the interface with standard logic input is simplified, and the symmetric design provides superior differential temperature compensation. However, in applications where these considerations are not of importance, the additional Schottky diode 122 providing a current path to ground via transistor 118 may be omitted with no loss in dynamic circuit performance.

The present invention proposes a laser diode control system wherein a high-speed drive circuit for a laser diode, as described in detail above, is combined with reflex exposure control. FIG. 1 further shows, in the lower portion thereof, the basic elements of a reflex laser control circuit according to the present invention. As shown in the schematic, a laser diode, indicated as 50, within the laser source 10 is excited by means of current provided by a laser drive circuit such as shown in the top portion of FIG. 1. Coherent laser light flux originating in laser diode 50 is optically collimated to form writing beam 12, as shown in FIG. 4, but a portion of the output flux shown as 12a is directed to sensor 60 for reflex exposure control. In the preferred control mode, laser diode 50 is always operated at a lasing level well above the minimum needed for full exposure of pixels on the latent image surface within the available exposure time over the full range of permissible ambient conditions.

A sensor photodiode 60 is positioned to receive a fixed portion of the total light flux emitted by laser diode 50. As shown in FIG. 4, sensor diode 60 may be placed, for example, off-axis with respect to the collimation optics forming the main writing beam 12, in a position where a portion of the laser flux emitted from the front aperture of laser diode 50 in the general direction of the collimation optics may be directed to sensor photodiode 60. Alternately, another design option is to locate sensor photodiode 60 in general alignment with the "back facet" of laser diode 50 to collect light flux emitted through the rear reflector of the laser diode cavity. What is important is that a fixed portion of the generated light flux be collected by sensor 60 so that the light output intensity of laser diode 50 is monitored in real time.

It will be understood by those in the art that off-axis flux (here indicated as off-axis beam 12a) would not normally pass through the collimation optics and contribute to writing beam 12. Likewise, any light flux that "leaks" through the rear cavity reflector is incidental and plays no part in forming the writing beam 12. In both cases the intensity of the writing beam 12 incident on the photoreceptor surface is therefore implied only indirectly. Although relative changes in the intensity of off-axis beam 12a and light flux leaking through the back facet are equally useful for sensing short term relative changes in operating power level, the off-axis technique is superior to the back facet configuration because the radiation pattern from the front aperture of the laser diode is relatively invariant with respect to device aging and changes in apparent output due to aperture contamination. Directly sensing the output from the front aperture also reduces the calibration extremes that would normally be needed to accommodate the wide range in front to back output ratios possible even from batch to batch in a given laser diode device type. Perhaps even more important, a much higher power level is generally available from the front facet, even at wide off-axis angles, making the detection circuitry much easier to implement with very fast response.

The portion of light flux originating in laser diode 50 and absorbed by the active volume of sensor photodiode 60 creates a photocurrent proportional to the intensity of the incident light with a typical conversion efficiency of 0.3 to 0.4 amps per watt. Associated with sensor diode 60 is a device for accumulating the photocurrent passing through sensor photodiode 60, hereshown in the form of an integrating capacitor 62. The amount of charge accumulated on capacitor 62 is a direct measure of the time-integrated light flux, or the cumulative product of light intensity and duration of the light flux absorbed by sensor diode 60. Capacitor 62 thus serves to integrate the total charge passed by photodiode 60 over a given time period which is directly proportional to the total light flux received by the sensor diode 60 during that same period. Photoinduced current flows through photodiode 60 from voltage source 64, building up a potential difference between the terminals of capacitor 62 from an initial uncharged state. The voltage at any given moment is given by the net accumulated charge in coulombs, divided by the capacitance value in farads.

Differential comparator 66 is configured to sense the voltage appearing on capacitor 62 with respect to a fixed reference voltage. The reference voltage is selected to yield optimal exposure from laser diode 50 in its intended ROS application. In addition to the value of capacitor 62 in the circuit, factors that affect the value of the reference voltage include the throughput efficiency of the ROS optical system as a whole, the intrinsic sensitivity of the photoreceptor surface, the width and speed of the photoreceptor, as well as the ROS system resolution and the fraction of the laser output power incident on sensor photodiode 60. In a fixed optical configuration with all these factors constant, sensor diode 60, in combination with capacitor 62, forms an electronic analog of the photoreceptor spot 16 being exposed by the working beam 12. Photocurrent proportional to the intensity of the incident light is generated in both the active volume of the sensor photodiode and the photoreceptor layer, and in both cases the integrated photocurrent causes a net change in the voltage on a capacitive element, which, in the photoreceptor case, is the capacity of the photoreceptor layer itself. As a result of the direct correspondence between the level of discharge of the photoreceptor and the voltage accumulated on capacitor 62, it can be seen that the circuit responds to the actual exposing efficacy of laser diode 50 in a consistent way under a wide range of operating conditions. In the preferred embodiment of the present invention, precise regulation of photoreceptor exposure is provided by controlling the duration of the laser diode excitation for each and every pixel area which is desired to be exposed on the photoreceptor surface.

Figure 2:
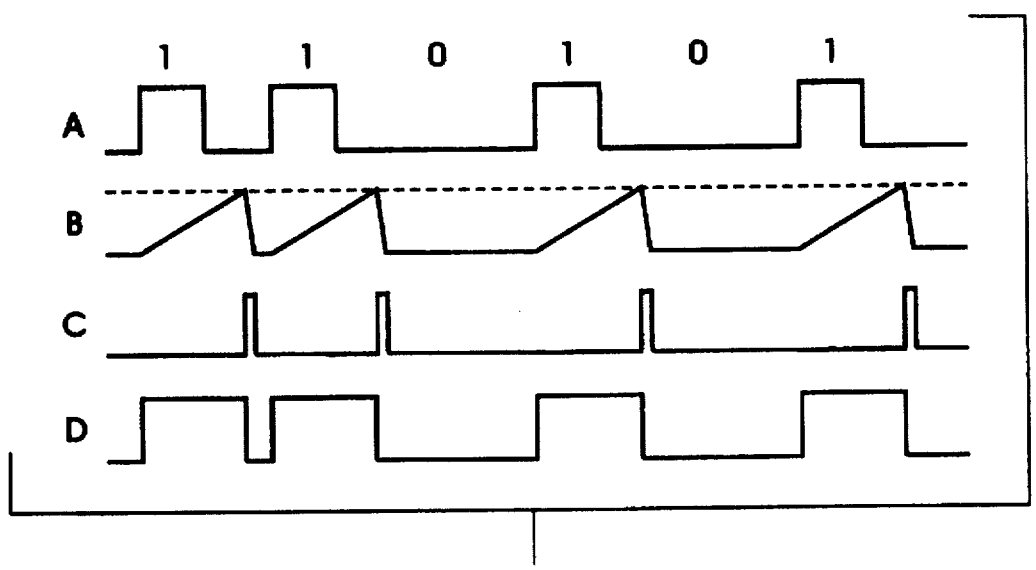
FIG. 2 is a set of comparative waveforms relating to the operation of the circuit of FIG. 1.

FIG. 2 is a timing diagram showing voltage waveforms at four critical points in the circuit of FIG. 1 which illustrates the exposure of sequential pixels along a scan line according to an example serial data string 110101. The waveform labeled A is the logic voltage applied to the "set" input S of flip-flop 54 in FIG. 1. The pattern of waveform A can be seen to correspond directly to the data pattern 110101. Positive logic transitions of waveform A set the Q output of flip-flop 54 to the "true" or high condition thereby increasing the current level delivered to laser diode 50 and causing it to emit a coherent laser beam. Writing beam 12 emitted by laser diode 50 illuminates the photoreceptor surface causing a picture element to be exposed, while photocurrent from sensor diode 60 is accumulated on capacitor 62 resulting in a voltage ramp shown as waveform B.

Each subsequent positive logic transition of waveform A reinitiates the excitation of laser diode 50. The rate at which the voltage ramps of waveform B increase depends on the light flux intensity received by sensor diode 60. When the ramp voltage equals the reference voltage, shown as a broken line in FIG. 2, the output of comparator 66, shown as waveform C, makes a sharp positive transition indicating that the integrated light flux received by sensor diode 60 has reached its critical value. Waveform C is applied to the clock input of flip-flop 54 in such a way that each positive transition resets the Q output to its original standby state (Q equals "false" or low) terminating laser action by returning the operating current to the bias level. Note that short data pulses are required at the S="set" input of flip-flop 54 to initiate lasing action in laser diode 50 on demand without interfering with the termination of laser emission which is under reflex control. In the circuit implementation shown in FIG. 2, the flip flop is reset at the clock transition by transferring the D input (always "false") to the Q output. The flip flop could just as well be directly reset through the R input, with the D input always "true" and RZ (return to zero) positive data transitions applied at the clock input the configuration shown provides a convenient means of implementing an unconditional reset at the beginning of each scan line through the application of a short Start of Scan (SOS) pulse at the R input.

Following the completion of pixel exposure and quenching of laser diode 50, capacitor 62 is immediately discharged so that subsequent accumulation cycles can start with capacitor 62 in the same initially uncharged state. Capacitor 62 is discharged by transistor 70 which shunts previously accumulated charge directly to ground. In FIG. 2, the base of transistor 70 is connected to the NOT-Q output of flip-flop 54 (connection not shown), so that discharge of capacitor 62 takes place whenever the laser is in the standby state. The discharge of capacitor 62 is shown in FIG. 2 as the steep downward-sloping portions of waveform B.

It is the intended function of the circuit in FIG. 1 to act as a "reflex" exposure control system for laser diode 50. Sensor diode 60 receives light directly from laser diode 50; the received light is directly indicative of the cumulative exposure of the photoreceptor induced by writing beam 12. When the sensor diode 60 has received the correct measure of light flux from laser diode 50 (i.e., consistent with the desired exposure level of photoreceptor 18 by writing beam 12), the system quenches, laser diode 50. This "reflex" system obviates many real-time, real-world performance variations in a laser diode such as 50. If the power output of laser diode 50 is relatively low due to an elevated ambient temperature or device aging, the system extends the duration of emission until the correct measure of light flux has been detected by sensor diode 60; alternatively, if under certain conditions the intensity of the beam from laser diode 50 is relatively high, lasing is terminated sooner.

The cycle of accumulating charge and quenching the emission of a writing beam from laser diode 50 is preferably repeated for each and every pixel exposure represented by the incoming digital data stream. As is known in the art of binary or on-off raster output scanners, each sequential bit being either a 1 (true) or 0 (false) in the input data stream corresponds to one pixel in the printed image; of course in this embodiment the exposure cycle need only come into play when the pixel is intended to be discharged by the laser, i.e., when a logical 1 (true) appears at the S input of flip flop 54. In the absence of logical 1=true input, the system can be considered to be in the standby or inactive mode. It is the function of the rotating polygon 14, noted above, to scan the writing beam 12 created by laser diode 50 to sequential pixel-sized spots in the raster image being created on the photoreceptor.

Figure 3A:
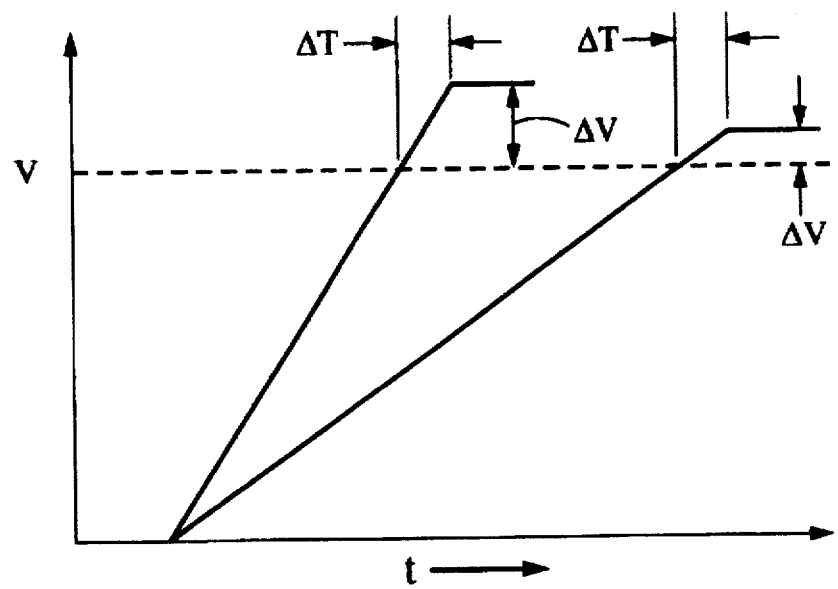
FIGS. 3A and 3B are comparative waveforms illustrating the correction of triggering delay in the present invention.
Figure 3B:
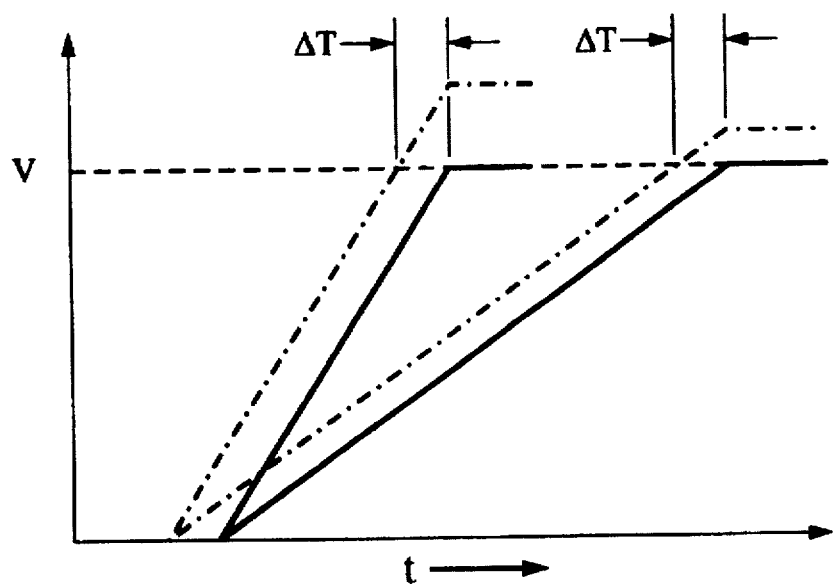

A practical concern with the basic system of the present invention is the non-linearity caused by a small but irreducible circuit delay between the accumulation of the critical charge on capacitor 62 and the actual termination of lasing in laser diode 50. To a good approximation, the reaction times of comparator 66 and flip-flop 54 operating in series is constant. The non-linearity is introduced because laser diode 50 remains operational during the delay and adds to the charge accumulated on capacitor 62 at a rate that depends on the actual power level of the laser diode source which is not constant. To illustrate, FIGS. 3A and 3B are comparative graphs showing the waveform B voltage ramps of FIG. 2 in greater detail. In both graphs, the x-axis is time and the y-axis is the voltage on capacitor 62 as a result of the accumulation of charge. In FIG. 3A, the two upward-sloping ramps represent different rates of voltage rise on capacitor 62 in response to two different operational levels of laser diode 50; the less steeply sloped line associated with a lower light level incident on sensor 60 takes proportionately longer to reach the threshold voltage. The difference in operating time between the initiation of the ramp and arrival at the threshold value V provides the basic regulating action of the circuit of FIG. 1. However, the intrinsic delay, shown as $\Delta T$, in quenching laser diode 50 in response to reaching the threshold causes the capacitor voltage to increase beyond V by an amount $\Delta V$ before lasing is actually terminated. This $\Delta V$ represents excess flux incident on photodiode 60, and, by implication, indicates an overexposure of the photoreceptor by a proportional amount.

It will be noted that in spite of the delays $\Delta T$ being equal, the magnitude of $\Delta V$ depends on the slope of the capacitor voltage ramp and hence the mean operating power at the time the exposure was made. When laser diode 50 emits at a higher level, $\Delta V$ and the corresponding overexposure will be greater; if the power output of laser diode 50 is relatively weak, the value of $\Delta V$ will be proportionately smaller, as shown at the right hand side in FIG. 3B.

According to one embodiment of the present invention, and with continued reference to FIG. 1, the total circuit time delay $\Delta T$, caused by the finite reaction times of both comparator 66 and flip-flop 54, can be compensated by placing a fixed resistor 80 of value R in series with capacitor 62 such that the product of R times C is numerically equal to the nominal circuit delay $\Delta T$. Those familiar with the electronics art will recognize "RC" as the relaxation time constant appearing in the exponent $e^{-t/RC}$ describing the natural behavior of a series resistor capacitor network with time. By providing this additional series resistor 80 in the system, the potential sensed at the input of comparator 66 is offset from the voltage on capacitor 62 by an amount proportional to the current flowing into capacitor 62, as indicated by the broken lines in FIG. 3B. The voltage offset is given by IR=RC dv/dt, where dv/dt is the slope of the voltage ramp and can be seen to cause comparator 66 to respond early by a fixed amount which is independent of the slope.

Thus, by selecting the value of resistor 80 to satisfy the relationship RC=$\Delta T$, the voltage offset can be made to compensate exactly for the fixed time delays associated with the circuit response of comparator 66 and flip-flop 54. By effectively advancing the time at which the critical voltage at the input of comparator 66 is reached by an amount equal to the circuit time delay $\Delta T$, the laser is deactivated at exactly the point at which the voltage on capacitor 62 just reaches the reference value. Since $\Delta V$ is a measure of excess flux sensed by photodiode 60, variations in exposure at the photoreceptor due to differences in laser diode operating level are eliminated.

It is to be noted that an average overshoot $\Delta V$ can be compensated by simply recalibrating the threshold reference voltage. However, very high quality imaging requires very close control on photoreceptor exposure and even small variations in $\Delta V$ can be problematic. Variations in the junction temperature in a laser diode typically cause a wide swing in optical output power at constant operating current. At the same time, printed images usually contain patterns that require exposure over a constantly changing duty cycle which results in uneven power dissipation in the junction. As a result, the light intensity available for exposing one pixel depends on the exposure pattern of previously exposed pixels. This effect is related to a similar mechanism called "droop" in which junction heating causes the intensity of the laser beam to fade within the exposure time of a single pixel. By correcting for integrated exposure on a pixel-by-pixel basis, the present invention corrects for these unwanted effects and others that change the laser output intensity, and compensates for manufacturing differences between individual laser diode devices as well.

There is further shown in FIG. 1 an operational amplifier circuit used to buffer the exposure adjustment input voltage, and source 68 is shown with an optional adjustment means. In FIG. 1, resistor 80 provides the desirable voltage offset associated with capacitor 62 which has been selected for the desired RC value by measuring the time delay $\Delta T$ of the comparator 66 and flip-flop 54 in actual operation. There is also provided, associated with reference voltage source 68, a relatively large capacitor 82 which, in combination with Schottky diodes 84 and a PNP discharge transistor in the emitter follower configuration, provides a system in which both inputs of comparator 66 are referenced to a common discharge level, by which common mode errors are minimized.

While the invention has been described with reference to the structure disclosed, it is not confined to the details set forth, but is intended to cover such modifications or changes as may come within the scope of the following claims.

I claim:

1. A raster output scanning apparatus for directing a modulated writing beam to a photosensitive surface to selectably expose a plurality of pixel areas thereon, comprising:

a laser diode adapted to output the writing beam;

a sensor diode positioned to receive a portion of light flux directly from the laser diode while the laser diode emits the writing beam to expose one pixel area on the photosensitive surface;

an accumulator associated with the sensor diode, adapted to accumulate charge created by the sensor diode resulting from light flux from the laser diode; and a comparator associated with the accumulator, adapted to monitor charge accumulated on the accumulator and output a quench signal when the charge accumulated on the accumulator exceeds a predetermined threshold level; and a drive circuit for applying voltage to the laser diode to cause the laser diode to output the modulated writing beam, the drive circuit including
     a drive switch, having an output connected to the laser diode, an input, and a base, the base causing a connection between the input and output when activated,
     a ground switch, having an output connected to ground, an input, and a base, the base causing a connection between the input and output when activated,
     a bias source, commonly connected to the input of the drive switch and the input of the ground switch, the bias source being of a voltage less than a lasing voltage of the laser diode,
     a switching source, commonly connected to the input of the drive switch and the input of the ground switch, the switching source being of a voltage greater than a lasing voltage of the laser diode when combined with the voltage of the bias source, and
     a video selector, adapted to selectably activate one of the base of the drive switch and the base of the ground switch;

the comparator being operatively associated with at least one of the ground switch and the drive switch, whereby the quench signal from the capacitor operates to turn off the laser diode.

2. The apparatus of claim 1, further comprising a flip-flop interposed between the comparator and the drive circuit, the flip-flop having complementary outputs to the ground switch and the drive switch respectively.

3. The apparatus of claim 1, wherein the predetermined threshold level is related to a desired exposure level for a pixel area on the photosensitive surface.

4. The apparatus of claim 1, wherein the comparator is operable for each and every pixel area to be exposed to create a desired image on the photosensitive surface.

5. The apparatus of claim 2, the accumulator including
   a capacitor for accumulating charge created by the sensor diode resulting from light flux from the laser diode; and
   a predetermined resistance associated with the capacitor, the resistance and capacitor forming an RC circuit having a predetermined time constant associated therewith.

6. The apparatus of claim 5, wherein the time constant is of a duration suitable to compensate for a time delay of the flip-flop activating the ground switch in response to the quench signal, and a time delay of the comparator outputting the quench signal in response to the charge accumulated on the accumulator exceeding the predetermined threshold level.

7. The apparatus of claim 5, further comprising a reference exposure control voltage source, for inputting into the comparator a voltage relating to the predetermined threshold level for the charge accumulated on the accumulator.

8. The apparatus of claim 7, further comprising an RC circuit operatively disposed between the reference exposure control voltage source and the comparator.

9. The apparatus of claim 8, further comprising a common discharge switch for discharging the RC circuit associated with the sensor diode and the RC circuit associated with the reference exposure control voltage source.

10. The drive circuit of claim 1, the drive circuit further including a Schottky diode disposed between the switching source and the input of the drive switch.

11. The drive circuit of claim 1, the drive circuit further including a Schottky diode disposed between the switching source and the input of the ground switch.

12. The drive circuit of claim 1, the drive switch including a PNP transistor, the input being an emitter of the PNP transistor.

13. The drive circuit of claim 1, the drive circuit further including
   a second ground switch, having an output connected to ground, an input, and a base, the base causing a connection between the input and output when activated;
   a second switching source, commonly connected to the input of the drive switch and the input of the second ground switch, the second switching source being of a voltage greater than a lasing voltage of the laser diode when combined with the voltage of the bias source, and
   the video selector being further adapted to activate the second ground switch.

* * * * *